United States Patent [19]

Clark

[11] 4,171,619

[45] Oct. 23, 1979

[54] COMPRESSOR ASSISTED ABSORPTION REFRIGERATION SYSTEM

[76] Inventor: Silas W. Clark, P.O. Box 43, Golden, Colo. 80401

[21] Appl. No.: 887,445

[22] Filed: Mar. 16, 1978

[51] Int. Cl.² .................... F25B 27/00; F25B 15/00; F25B 7/00
[52] U.S. Cl. ........................... 62/2; 62/101; 62/335; 62/476; 62/483
[58] Field of Search ................ 62/2, 101, 476, 483, 62/489, 335

[56] References Cited

U.S. PATENT DOCUMENTS

| | | | |
|---|---|---|---|
| 2,248,178 | 7/1941 | Kuenzli | 62/483 |
| 2,307,380 | 1/1943 | Baker | 62/101 |
| 2,548,699 | 4/1951 | Bernat et al. | 62/483 |
| 3,824,804 | 7/1974 | Sandmark | 62/335 |
| 4,011,731 | 3/1977 | Meckler | 62/2 |
| 4,030,312 | 6/1977 | Wallin | 62/2 |
| 4,031,712 | 6/1977 | Costello | 62/483 |

*Primary Examiner*—Lloyd L. King
*Attorney, Agent, or Firm*—Bruce G. Klaas

[57] ABSTRACT

In an absorption refrigeration system comprising a generator, a condenser, an evaporator, an absorber and a heat exchanger, a compressor is provided to improve generator output and performance. The compressor is operative between the evaporator and the absorber or between the generator and condenser to improve the output of the absorption cycle and is valved and connected to provide a vapor compression cycle using the condenser and evaporator of the absorption refrigeration system. A compressor may also be used with a second condenser and a second evaporator to heat or cool the generator or evaporator, respectively, of the absorption refrigeration system.

31 Claims, 4 Drawing Figures

COMPRESSOR ASSISTED ABSORPTION REFRIGERATION SYSTEM

BACKGROUND OF THE INVENTION

The present invention relates to refrigeration systems, and more particularly to an absorption refrigeration system powered by solar energy.

The heating of buildings through the use of solar energy involves the mounting of external solar collectors which absorb the sun's heat into a heat transfer fluid, usually water. Heated water is then circulated or stored for later use in heating the building. Since, in warmer climates, the energy used in cooling a building may exceed that used in heating the building, efforts have also been made to utilize solar energy to cool and air condition buildings.

One approach has been the use of a solar energy powered absorption refrigeration system. Absorption refrigeration systems in general are well known in the art. They commonly employ steam or a gas flame to vaporize a refrigerant from a solution of a refrigerant and an absorber. In a solar energy application, solar heated hot water at about 200° F. (93° C.) has been used to heat the solution in the generator. Water has been typically used as the refrigerant; lithium bromide has been typically used as the absorber because it has a very strong affinity for water vapor. The solution in the generator boils violently, carrying water vapor and concentrated lithium bromide up to a separator, where the two are separated by baffles. The vapor passes to a condenser, where it is condensed, at 0.25 atm (50-60 mm Hg) and then passes through an expansion device to the low pressure side of the system where the water vaporizes at 6 to 9 mm Hg (40° F., 4° C.) causing a cooling effect on circulating water or air passed across the evaporator tubes. From the evaporator, the expanded water vapor passes to an absorber. The absorber contains concentrated solution which flows by gravity from the separator of the generator and is trickled over a cooling coil. The vapor from the evaporator is absorbed into the solution on the cooling coil and the reconstituted solution is passed against a heat exchanger containing hot concentrated solution passing from the generator to the absorber. The reconstituted solution is returned to the generator to complete the cycle. Outside water is used in the cooling coil of the absorber and the condenser.

The solar powered absorption refrigeration system uses water at 200°-210° F. to boil the solution in the generator. This water is heated by solar panels. With improvements in the generator heat exchange surface, the addition of a mechanical solution pump and the use of separate cooling streams for the condenser and absorber, a three ton unit may be operated at full capacity at 195° F. water temperature.

Another approach to solar energy powered cooling has been the so-called Rankine-cycle solar air conditioner. A Rankine cycle refers to the successive compression, heating, expansion, and condensation of a working fluid in a heat engine, such as a steam engine. The cycle may either be closed, where the working fluid is recycled, or open, where the expanded and condensing steam is simply vented to the air. In the Rankine cycle solar air conditioner, solar heated hot water at 215° F. (102° C.) from solar panels enters a multiple stage boiler where a working fluid of a liquid refrigerant R-113 (trichlorotrifluoroethane) is vaporized and used to turn a small turbine. The expanded refrigerant is cooled, condensed and pump returned to the boiler. The turbine is used to drive a compressor in a conventional vapor compression refrigeration system.

In a conventional vapor compression refrigeration system, a refrigerant, which is a compressible, condensible gas, is compressed in a compressor, passed to a condenser where the gas is condensed to a liquid, and passed through an expansion device to a low pressure evaporator, where evaporation and cooling takes place. The compressor in the Rankine cycle solar vapor compression system is driven either by the turbine or by a back-up electric motor.

The need for back-up systems for night-time or marginal weather conditions is presently a principal problem in the development of solar energy cooling systems. In the case of solar energy absorption refrigeration systems, a complete vapor compression system has been used as a back-up. The use of the back-up systems in prior art solar cooling systems has been unsatisfactory because of the necessity of high temperatures to power the system. Back-up systems must therefore be used under marginal conditions, when solar energy is available but the solar heated water is at a temperature below that needed to power the system. In a solar energy absorption refrigeration system there is a temperature, typically around 160° F. (71° C.), below which no refrigeration is possible due to lack of vaporization in the generator. Furthermore, as the generator temperature falls from the optimum, the coefficient of performance (C.O.P.) or efficiency of the system is also decreased.

Due to the low C.O.P.'s of prior art solar energy cooling systems, a large amount of heat must be put into the system to obtain sufficient cooling output. This necessitates an additional expense in the use of high performance collectors such as concentrators, parabolic sun trackers, evacuated tube collectors, etc. If low performance flat plate collectors are used, their area must be increased, at a corresponding increase in cost.

Accordingly, it is an object of the present invention to provide a thermally efficient refrigeration system.

It is another object of the present invention to provide a solar energy powered refrigeration system which needs no separate back-up system.

It is a further object of the present invention to provide a solar energy powered refrigeration system which can utilize low grade solar energy.

It is yet another object of the present invention to provide a solar energy powered refrigeration system which can utilize low performance solar collectors.

SUMMARY OF THE INVENTION

To achieve these and other objectives, a refrigeration system is provided wherein an absorption refrigeration system is compressor assisted. In the preferred embodiment, the compressor is on a line which is connected and valved to other lines so that the compressor may be either bypassed, used to compress vapor passing from the evaporator means to the absorber means, or used as a compressor between the evaporator means and condenser means to provide a vapor compression refrigeration system. Since the compressor acts on refrigerant vapor circulating within the absorption refrigeration cycle, this embodiment may be termed a "compressor internal" configuration. In another compressor internal configuration, the compressor is on a line which is connected and valved to other lines so that the compressor may be either bypassed, used to compress vapor passing from the generator means to the condenser means, or used between the evaporator means and the condenser means to provide a vapor compression refrigeration system. Alternatively, the compressor may be used for external assistance of an absorption refrigeration system in a separate vapor compression refrigeration cycle. In one embodiment, heat from a solar energy source heats a refrigerant boiler means to provide a refrigerant vapor which is compressed and then condensed in a second condensing means, apart from the absorption refrigeration condensor, to reject heat to the absorption refrigeration generator. Another compressor external configuration comprises a second condensing means juxtaposed with the evaporator means of the absorption refrigeration system so as to be thermally coupled. Heat absorbed by the evaporator means is used for condensation in the second condensing means. The second condensing means is fed by a compressor and outputs to a second evaporator means, apart from the evaporator means previously used for condensation. The secondary evaporator means produces output cooling, for example to a circulating water stream in a house. Compressor external configurations may be advantageous in that two separate refrigeration cycles are used and therefore, two separate refrigeration solutions are used.

A relatively small amount of electrical energy used to power a compressor configuration in accordance with the present invention can produce a significant increase in performance of an absorption refrigeration system. The compressor configuration also extends the useful range of the absorption refrigeration system, permitting the use of low performance, low cost solar collectors. It is contemplated that collector cost be further reduced by improved heat exchanger means between the generator means and the absorber means.

An important aspect of the present invention is the selection of the proper refrigerant-absorbent solution for use in the compressor internal configuration. Many commonly used absorption refrigeration solutions do not meet the requirements of a vapor compression refrigerant. Suitable solutions are dichlorodifluoromethane (F-12) into trichlorotrifluoroethane (F-113); F-12 into carbon tetrachloride; dichlorotetrafluoroethane (F-114) or F-12 into perchloroethylene; F-114 into toluene, or para-xylene; pentane into p-xylene; trichlorofluoromethane (F-11) into biphenyl; and F-11 into perchloroethylene.

DESCRIPTION OF THE PREFERRED EMBODIMENT

In General

The present invention involves a continuous absorption refrigeration unit which utilizes a mechanical compression device to greatly improve performance characteristics. The improved performance is based on the fact that an absorption refrigeration apparatus is fundamentally a heat-driven refrigeration device. Heat is used to boil a solution of a refrigerant and an absorber in the generator to supply vaporized refrigerant to the refrigeration cycle. Being heat driven, the absorption refrigeration device has several advantages over a vapor compression type of refrigeration device. Among these advantages are the lack of necessity of a compressor with its attendant expense and moving parts, and the ability of the unit to function purely on heat energy. The absorption refrigeration device also suffers several disadvantages from being heat driven. Being heat driven, it is subject to the first and second laws of thermodynamics. These laws state that the work done in a system is equivalent to the heat input to the system, and that heat energy cannot be continuously obtained from a body having a temperature equal to or lower than that of surrounding bodies. The laws of thermodynamics thus impose an upper limit on the potential output of an absorption refrigeration device. In an absorption refrigeration device with a single evaporator and a single absorber, this output is limited even further. For a constant heat sink temperature, i.e. condenser and absorber temperatures, and a constant evaporator temperature, there is a generator temperature below which no boiling, and therefore no refrigeration, is possible. This temperature may be termed the generator shut-off temperature. Compressor assisting an absorption refrigeration device lowers the generator shut-off temperature and also improves the thermal C.O.P. of the device. The manner in which the compressor performs these functions is best illustrated by the following Equation (1):

$$C.O.P. = Q_1/Q_4 = T_1(T_4-T_3)/T_4(T_2-T_1),$$

wherein
  C.O.P. = Coefficient of performance of a theoretically perfect absorption refrigerant device;
  $Q_1$ = Heat absorbed in evaporator at absolute temperature $T_1$ and pressure $P_1$ = heat of vaporization of refrigerant;
  $Q_4$ = Heat furnished to generator at $T_4$ and $P_4$ = heat of vaporization of refrigerant plus sensible heat of solution;
  $T_1$ = evaporator temperature;
  $T_2$ = condenser temperature;
  $T_3$ = absorber temperature; and
  $T_4$ = generator temperature.

Figure 1:
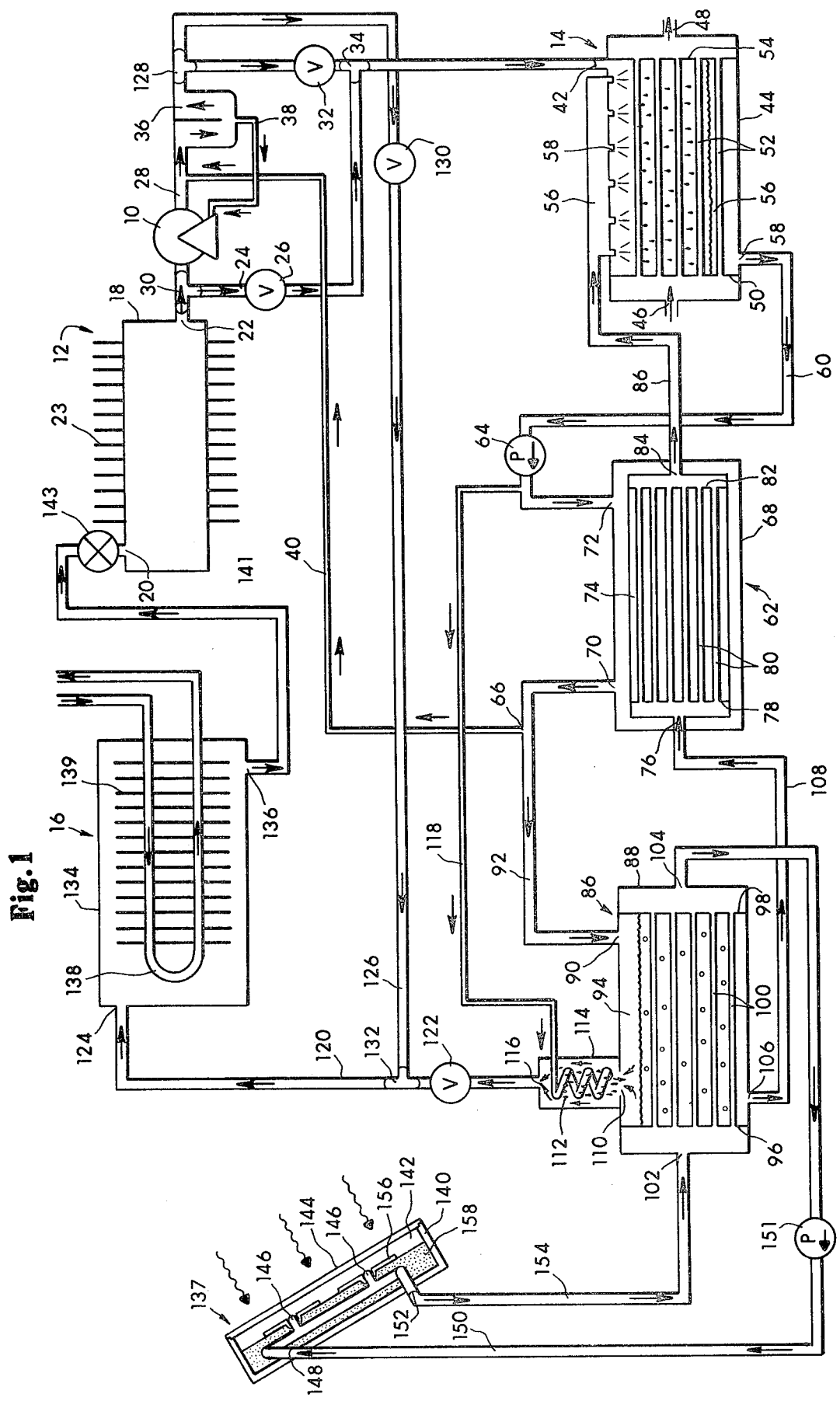
FIG. 1 is a diagrammatic view illustrating the flow of vapor and solution through the various components of the refrigeration system in a compressor internal configuration.
Figure 2:
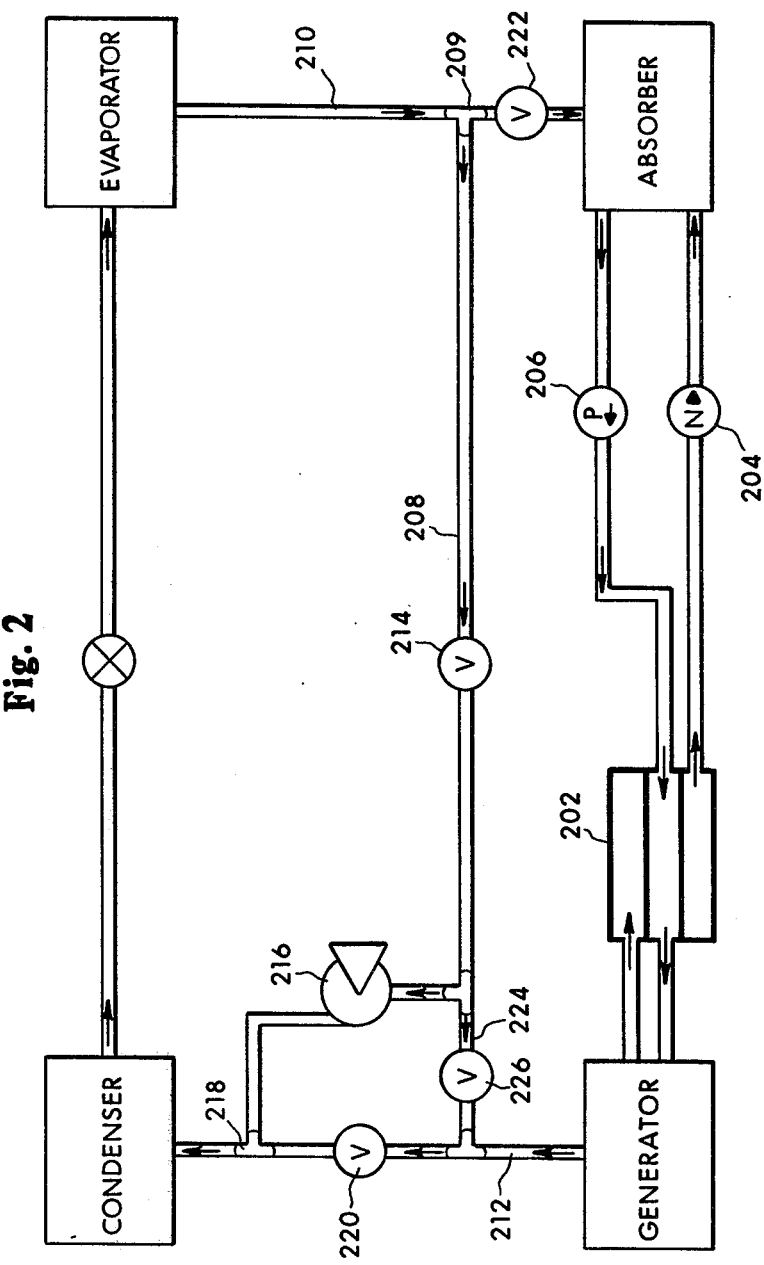
FIG. 2 is a diagrammatic view of the refrigeration system of the present invention in an alternative compressor internal configuration.
Figure 3:
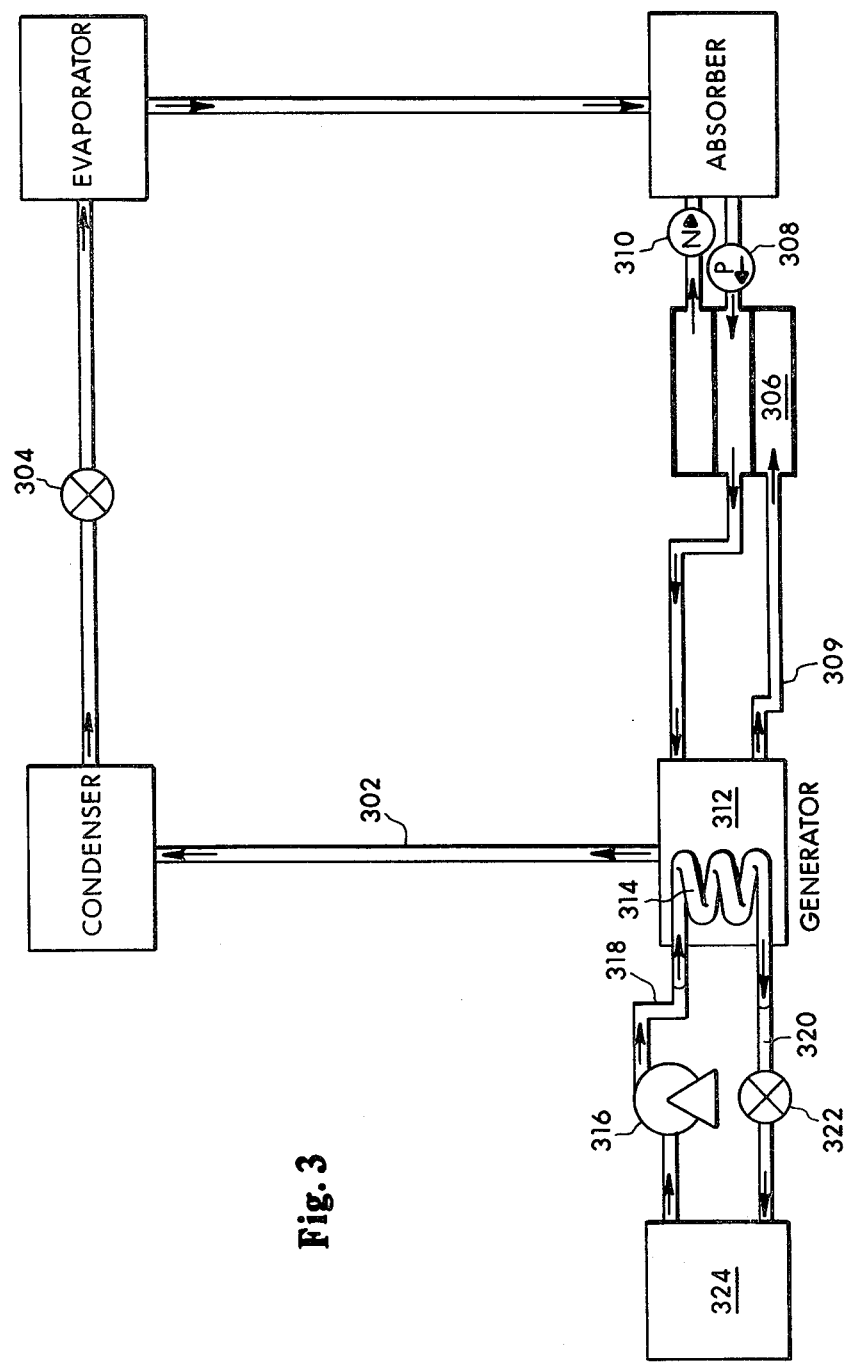
FIG. 3 is a diagrammatic view of the refrigeration system of the present invention in a compressor external configuration.
Figure 4:
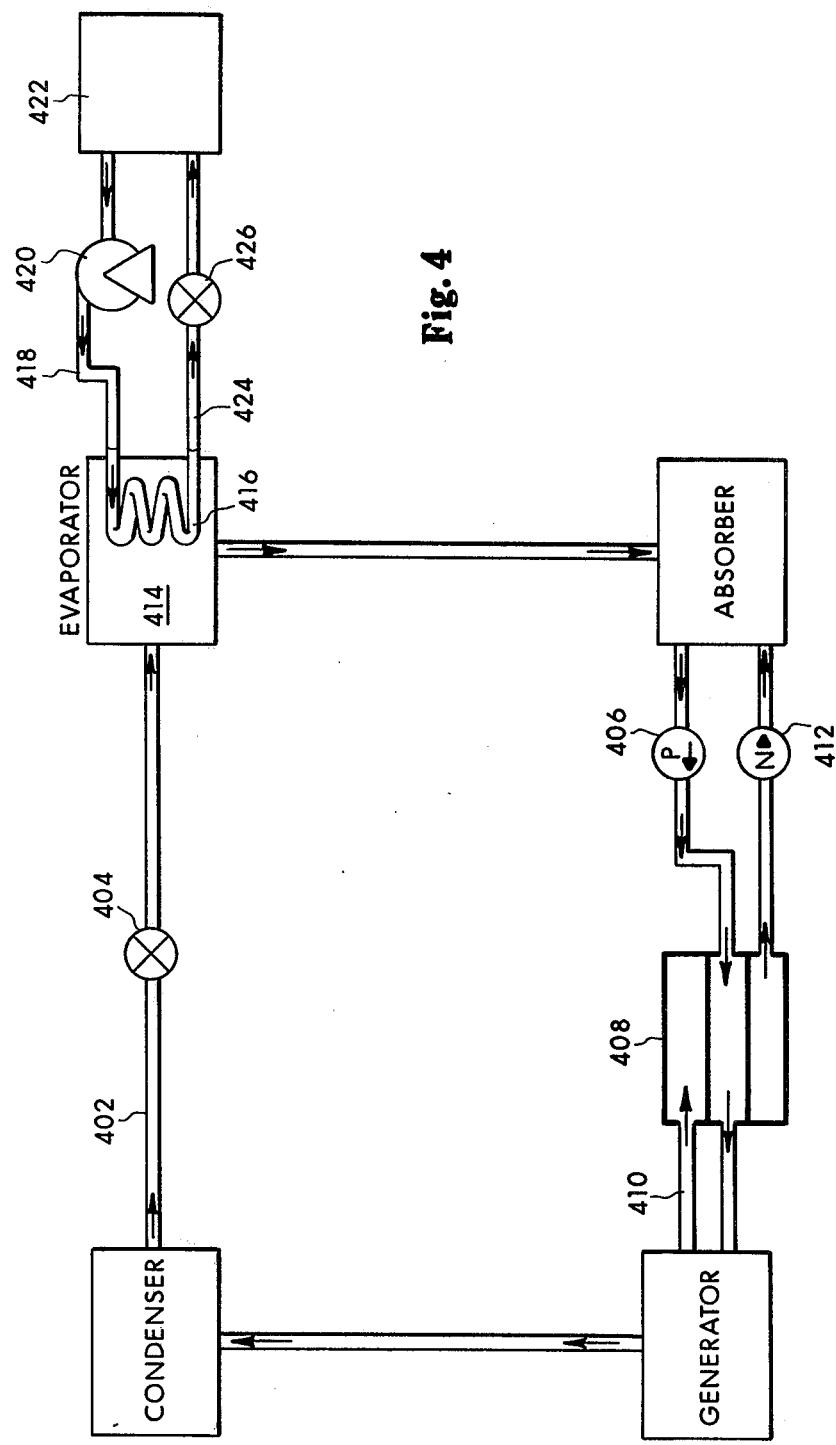
FIG. 4 is a diagrammatic view of the refrigeration system of the present invention in an alternative compressor external configuration.

Equation (1) demonstrates that raising the evaporator temperature or lowering the condenser temperature will increase the C.O.P. In the embodiment of FIG. 1, the compressor is used to compress vapor passing from the evaporator to the absorber. The increased pressure in the absorber causes more refrigerant to be absorbed into solution, creating a more dilute solution and thereby lowering the boiling point of the solution and, accordingly, the shut-off temperature of the generator. The compressor also causes the generator to "see" a higher evaporator pressure and, according to known pressure-temperature curves, a higher evaporator temperature $T_1$. From Equation (1), increasing $T_1$ can be seen to increase C.O.P. In the embodiment of FIG. 2, the compressor is used to compress refrigerant vapor passing from the generator to the condenser. This reduces pressure in the generator and therefore lowers the boiling point of the refrigerant solution. This lowers the generator shut-off temperature. The compressor also causes the generator to "see" a lower condenser temperature than actually is present in the condenser. This effectively lowers $T_2$ and, as can be seen from Equation (1), increases C.O.P. In the embodiment of FIG. 3, the generator of the absorption refrigeration unit is heated by heat rejected from a second condenser fed by a compressor, and connected to a refrigerant boiler to provide a separate vapor compression cycle. The compressor in this embodiment actually raises generator temperature and increases $T_4$ to improve C.O.P. In the embodiment of FIG. 4, a compressor is utilized to assist an evaporator in an absorption refrigeration unit. Heat absorbed by the evaporator cools a second condenser which is part of a vapor compression cycle. The second condenser and the evaporator are juxtaposed for heat transfer, so heat from the condenser is also rejected to the evaporator. The evaporator temperature is actually raised causing evaporator pressure to be raised and causing more refrigerant to be absorbed, thereby lowering the boiling point of the solution and the generator shut-off temperature. From Equation (1), raising evaporator temperature $T_1$ can be seen to increase C.O.P. In each embodiment, the small amount of energy consumed by the compressor is more than offset by the increased output of the refrigeration system.

The Embodiment of FIG. 1

Referring now to FIG. 1, the presently preferred embodiment of the refrigeration system of the present invention comprises a compressor 10 which is used to compress refrigerant vapor from an evaporator 12 and output compressed vapor to either an absorber 14 in an absorption cycle or to a condenser 16 in a compression cycle.

The evaporator 12 comprises a shell 18 formed of metal or other thermally conductive material and comprising an upper inlet opening 20 for receiving vaporizing refrigerant and a lower outlet opening 22 for permitting withdrawal of expanded, vaporized refrigerant. The shell 18 of the evaporator 12 is provided with a number of outwardly extending fins or protruding flat plates 23 which serve to transfer heat which is being absorbed from the surrounding material through the evaporator and to the refrigerant. The surrounding material is the air, water, or other heat transfer fluid which is cooled by the evaporator and circulated to produce the desired cooling effect in the structure to be cooled.

The outlet opening 22 of the evaporator leads to a first line 24 leading to a first valve 26 and from there to the absorber 14. The valve 26, as well as the other valves in the present refrigeration system, may be any device for alternatively permitting or prohibiting the flow of fluid therethrough. Gate valves, ball valves, plug cocks and the like may all be suitably employed. All lines and valves, except as otherwise noted, have similar fluid handling capacities.

A second line 28 joins the first line 24 through a tee connection 30 located in the first line 24 between the evaporator 12 and the first valve 26. The second line 28 passes from the tee connection 30 to the low side of the compressor 10, out through the high side of the compressor and through a second valve 32 to another tee connection 34 located in the first line between the first valve 26 and the absorber 14.

The second line 28 passes through an oil separator 36 located just downstream from the compressor. The purpose of the oil separator arrangement is to prevent oil accummulation in the refrigerant lines. The presently preferred compressor 10 is of the piston-type, due to the relatively low cost of such compressors. Piston-type compressors employ a reciprocating piston in a cylinder having port arrangements to compress and propel the incoming fluid. The piston moves on a rod connected to a crankshaft lubricated in a crankcase. Oil from the crankcase tends to escape as a mist into the working fluid. The oil separator 36 comprises a chamber having inlet and outlet passages and a filter, sieve, mesh or the like in between. Oil mist from the compressor 10 collects on the filter and drops down to a return line 38 leading back to the compressor crankcase. The oil separation arrangement further comprises a small bleed line 40 which returns solution passing between the heat exchanger and the generator back to the second line 28, between the oil separator 36 and the compressor 10. It is to be understood that types of compressors other than piston compressors, may be employed in the present invention. Certain compressors such as those which utilize the working fluid for lubrication and have a sealed motor, do not introduce oil into the working fluid and may be used without an oil separation arrangement. A rotary, or helirotor type compressor operates on a constant low level (around 4%) of oil in the working fluid and may be used with only a return bleed line from the absorber output line to the heat exchanger, to the line entering the compressor. Further information on compressors may be found in Chapter 6 of the *Chemical Engineer's Handbook*, R. H. Perry and C. H. Chilton, eds., 5th ed., 1973, McGraw-Hill Book Co., hereby incorporated by reference.

The first line 24 passes from the evaporator to an upper inlet opening 42 of the absorber 14. The absorber 14 comprises an airtight outer shell 44. At the opposite ends of the absorber 14 inlet and outlet openings 46, 48 are provided in the shell for a longitudinal flow of cooling water from a cooling tower or the like (not shown). A baffle plate 50 extends laterally across the interior of the absorber 14 and prevents cooling water from flowing past the plate and through the interior except through a plurality of longitudinally extending tubes 52 which open through the baffle plate. The tubes extend along a substantial length of the absorber and terminate in a second baffle plate 54, similar to the first baffle plate 52, through which the tubes communicate to an outlet opening 48. A header 56 is formed in or fixed on the outside of shell 44 and leads to a number of spray nozzles 58 through which fluid in the header is sprayed into the absorber and onto the longitudinal tubes 52. The vaporized refrigerant from the evaporator 12 is passed through the inlet opening 42 in the absorber and contacts a film of so-called strong solution (i.e., rich in absorbent) from the generator being sprayed from spray nozzles 58. The cool tubes 52 provide a contact surface for the strong solution as it drips onto and over the tubes and provide a favorable environment for absorption of the vaporized refrigerant, entering the inlet opening 42, to form reconstituted solution to be recycled to the generator. The reconstituted solution collects in the bottom of the absorber 14 and forms a thin layer 56 of solution covering the lower outlet opening 58 through the absorber shell 44 to prevent the escape of vapor from the absorber. The film 56 and the structural integrity of the shell, as provided for instance by a seamless copper tube, and the tightly fitted spray nozzles 58 and baffle plates 50, 54, permit the absorber 14 to be pressurized by incoming vapor.

The reconstituted solution leaves the absorber through the outlet opening 58 to a line 60 leading to a heat exchanger 62. Line 60 has disposed therein a constant delivery solution pump 64 for delivering solution through the heat exchanger to the generator against the vapor pressure in the generator. The line 92 also includes a branch connection 66 between the heat exchanger 62 and the generator 86 for the above mentioned oil return bleed line 40. The oil return bleed line 40 may also be connected between the generator and the absorber 14.

The heat exchanger 62 comprises an outer shell 68 having an outlet opening 70 near one end and an inlet opening 72 near the other end, receiving fluid from line 60. Reconstituted solution from the absorber flows into the inlet opening 72, longitudinally through a substantial length of a main chamber 74 inside shell 68 and out the outlet opening 70. A second, countercurrent, fluid from the generator flows into a lateral end of the heat exchanger through a second inlet opening 76. A laterally extending baffle plate 78 prevents contact of the fluid in the main chamber 74 with the second fluid. Holes in baffle plate 78 lead to a corresponding number of small longitudinal tubes 80 extending through the main chamber 74 to a second baffle plate 82. The number of small tubes 80 should be maximized (on the order of 100) to provide maximum heat transfer surface between the fluid in the main chamber outside the tubes and the fluid flowing countercurrently in the tubes. Fluid passing out of the tubes 80 and through the baffle plate 82 exits the heat exchanger through an outlet opening 84 in the lateral wall of the heat exchanger and passes through a line 86 to the header 56 of the absorber 14. Fluid from the absorber, meanwhile, flows countercurrently in the main chamber, on the outside of the longitudinal tubes, to the generator to provide heat exchange between the fluids. A number of heat exchangers may be used in series. A suitable heat exchanger is manufactured by Bell & Gossett ITT of Morton Grove, Illinois. The heat exchanger improves the thermal efficiency of the refrigeration system by transferring heat between the hot, strong solution leaving the generator and the reconstituted solution entering the generator to be boiled.

The generator 86 comprises an outer shell 88 having disposed therein an upper inlet opening 90 connected through a line 92 to the outlet opening 70 of the heat exchanger 62. The line 92 also contains a branch connection 66 for the above mentioned bleed line 40. Fluid from the heat exchanger flows through the inlet opening 90 into the main chamber 94 of the heat exchanger, in which a level of boiling solution is maintained. The lateral ends of the main chamber are bounded by baffle plates 96, 98 as in the heat exchanger 62 and absorber 14. The absorber, heat exchanger and generator each contain one fluid in a number of small tubes exchanging heat with another fluid in a shell surrounding the tubes. For this reason, these units are termed tube and shell devices. If desired, the generator, heat exchanger and absorber may be constructed from the same basic tube and shell devices, with modifications for spray nozzles in the absorber and an analyzer section in the generator.

In the generator 86, a number of small tubes 100 extend between and open through the baffle plates. The small longitudinal tubes 100 are submerged in the refrigerant solution in the main chamber 94 and carry a hot fluid, such as water, for boiling the solution in the main chamber. The hot fluid enters an inlet opening 102 in a lateral wall of the generator, passes through the longitudinal tubes 100, and out of an outlet opening 104 in the lateral wall of the generator opposite the inlet opening. As the refrigerant solution in the main chamber is boiled, a refrigerant vapor component and a strong solution component are formed. The strong solution tends to sink towards the bottom of the main chamber 94 and is removed through a bottom outlet opening 106 connected to a line 108 leading to the inlet opening 76 of the heat exchanger 62.

The vaporized refrigerant rises in the main chamber 94 through an opening 110 in the upper shell wall 88 to a separator assembly 112, or analyzer section of the generator, comprising an upwardly extending shell wall 114 defining an elongated chamber bounded on the lower end by the generator shell opening 110 and on the upper end by an upper opening 116. A small tube 118 spirals downwardly in the separator chamber, terminating downwardly near the generator shell opening 110 and extending outwardly through an upper portion of the separator shell wall 114 and opening into the line 60 carrying solution from the absorber 14 to the heat exchanger 62. A small amount of solution from the line 60 between the absorber and the heat exchanger passes into the small tube 118 and spirals downwardly through the separator assembly to emerge from the lowermost end of the tube and fall into the solution in the main chamber 94 of the generator 86. The coiled tube 118 is colder than the mist rising upwardly past it from the generator and tends to condense and retain entrained absorbant which would otherwise rise to the evaporator with the refrigerant vapor.

A third line 120, containing a third valve 122 passes from the upper opening 116 of the separator assembly of the generator 86 to the inlet opening 124 of the condenser 16. A fourth line 126 extends from a tee connection 128, located in the second line between the compressor 10 and the second valve 32, through a fourth valve 130 to a tee connection 132 located in the third line 120 between the third valve 122 and the condenser inlet opening 124.

The condenser 16 comprises a shell 134 having an upper inlet opening 124 for incoming vapor and a lower outlet opening 136 for condensed liquid. In the interior of the condenser shell is a U-shaped tube 138 passing through the shell. The U-shaped tube 138 carries a cooling stream of a condensing fluid which may be either air or water from a cooling tower (not shown) or the outside. The same water used in the absorber in tubes 52 may be used in the U-tube 138. The U-tube 138 comprises a number of fins 139 extending outwardly therefrom near the shell wall 134. The fins 139 serve to improve heat transfer between the condensing vapor, which is rejecting heat, and the cooling stream, which is absorbing heat.

The condensed liquid flows out of the condenser 16 through the lower outlet opening 136 and into a line 141 which extends between the condenser and the upper inlet opening 20 of the evaporator 12. An expansion device 143, as is known in the art, and which may be an expansion valve, capillary tube, or the like, is interposed in the line 141 between the condenser 16 and the evaporator 12. A solar collector 137 is used to heat the heat transfer fluid which passes through the small tubes 100 in the generator. The solar collector 137 is of the flat plate type, that is, it is comprised of a large frame 140 having a large planar surface positioned transversely to incident sunlight and has an air space 142 between a covering glass plate 144 and water pipes 146 to be heated inside the air space. In addition, the present solar collector comprises a series of horizontal, parallel copper tubes connected in parallel by manifolds having an upper heat transfer fluid inlet 148 connected through a line 150 from the generator outlet 104 and a heat transfer fluid outlet 152 connected through a line 154 to the inlet opening 102 of the generator 86. A pump 151 serves to circulate the heat transfer fluid from the collector to the generator. For maximum solar absorption the copper tubes 146 are blackened and have blackened aluminum wings 156 extending outwardly therefrom, parallel to the glass 144. The tubes and wings are set in a thermal insulation layer 158, such as plastic foam. A flat plate type solar collector is a low performance collector, for which the present system is particularly suited. A low performance collector is one which produces less than 220° F. (104° C.) of usable heat energy.

Another type of low performance solar collector which can be used in the refrigeration system of the present invention is the open fluid-film solar collector. In this type of collector, a silicone oil flows down an open trough having an air space covered by a glazing sheet as in the flat plate collector. Solar energy is absorbed directly into the flowing silicone oil. The troughs are made of galvanized steel and are tilted longitudinally to permit downward flow of the silicone oil through the trough. The silicone oil is the heat transfer fluid of the collector. If this type of collector is used with the present refrigeration system, the silicone oil is passed to the generator to cause boiling of the refrigerant solution or passed to a secondary evaporator 324 as described in connection with FIG. 3. The open fluid-film collector is typically mounted on a roof in insulation between rafters and comprises fluid film stabilizers which extend between the lateral edges of the troughs and contain channels to keep the flowing oil spread out across the trough. The oil is recirculated to the roof by a metering pump. A suitable open fluid-film collector has been developed by Scientific Atlanta, Atlanta, Georgia, and is known as the Scientific Atlanta Collector.

The refrigeration system of FIG. 1 can operate in three modes. In the absorption mode, enough heat is provided by solar collector 137 to efficiently drive the generator 86. The first valve 26 is open, the second valve 32 is shut; the third valve 122 is open; and the fourth valve 130 is shut. The compressor 10 is off, and the solution pump 64 is on. The system is then operating as an absorption refrigeration unit, with refrigerant vapor being evaporated in the generator 86, condensed in the condenser 16, evaporated in the evaporator 12, and absorbed in the absorber 14 back into the strong solution to form a reconstituted solution which is passed countercurrently to the strong solution through the heat exchanger 62. When the energy from the solar collector is insufficient to drive the generator at a C.O.P. in the ideal range, the system operates in the hybrid mode. The first valve 26 is shut; the second valve 32 is open; the third valve 122 is open; and the fourth valve 130 is shut. The compressor 10 and the solution pump 64 are on. The system is now operating as a compressor assisted absorption refrigeration system. The vapor passing from the evaporator to the absorber is compressed, raising the thermal C.O.P. to approximately equal that of the absorption mode as described above. When the solar energy provided to the generator is insufficient to permit maintenance of a thermal C.O.P. in the ideal range even with compressor assistance, the system operates in the vapor compression mode. The first valve 26 is closed; the second valve 32 is closed; the third valve 122 is closed, and the fourth valve 130 is open. The compressor 10 is on and the solution pump 64 is off. Refrigerant now circulates between the evaporator, compressor and condenser as in a vapor compression refrigeration device. The opening and closing of the valves and the switching of the compressor and heat pump is preferably controlled by solenoid valves and relay switches. The valves and switches may be activated in response to temperature changes sensed in the generator or condenser by a thermistor, thermocouple, or the like, wired to a suitable control circuit.

The configuration of FIG. 1 is particularly advantageous in that waste heat added to the refrigerant vapor by the compressor 10 can be disposed of in the absorber 14. Absorption of superheated gases, such as vapor from the compressor, is limited by the heat transfer properties of the liquid film from the spray nozzles 58 rather than by the inferior heat transfer properties of a dry gas as would be the case if the superheat were to be disposed of in, for example, the condenser. A minor disadvantage of this configuration is an increase in the volume of fluid handled by the solution pump 64. The solution coming from and returning to the generator in the hybrid mode in this configuration is more refrigerant rich and therefore requires a greater amount of refrigerant solution in circulation.

An analysis of operating conditions for a compressor assisted absorption refrigeration system as shown in FIG. 1 is contained in the following example:

Using F-113 (trichlorotrifluoroethane) as the absorbent and F-12 (dichlorodifluoromethane) as the refrigerant, the following set operating conditions may be established: evaporator, 40° F. (4° C.); absorber and condenser, 90° F. (32° C.); 10° F. (5.5° C.) approach in recovery heat exchanger; 20° F. (11.1° C.) superheat in vapor leaving the analyzer section of the generator; 80% approach to saturation in the absorber; and three tons constant output. By plotting thermal C.O.P. against generator temperature, it can be determined that the pure absorption mode should be above 200° F. (93° C.) generator temperature, and the pure vapor compression mode should be below 120° F. (49° C.), with the hybrid mode in between 120° F. and 200° F. The unassisted generator shut-off temperature is 160° F. (71° C.).

The following values are obtained for a solution of F-12 absorbed into F-113:

| Gen. Temp. °F. | Ideal Compressor Work | Ideal Pump Work | Total K-watts | C.O.P. Thermal | C.O.P. Electric |
|---|---|---|---|---|---|
| | ft. lb/sec. | ft. lb/sec | | | |
| 200 | 0 | 123.14 | 0.1669 | 0.715 | 63 |
| 180 | 80.8 | 122.96 | 0.276 | 0.685 | 38 |
| 160 | 185.5 | 121.85 | 0.4166 | 0.672 | 25.3 |
| 140 | 321.1 | 120.9 | 0.5992 | 0.650 | 17.6 |
| 120 | 560 | 104.6 | 0.901 | 0.628 | 11.7 |

-continued

| Gen. Temp. °F. | Ideal Compressor Work | Ideal Pump Work | Total K-watts | C.O.P. Thermal | C.O.P. Electric |
|---|---|---|---|---|---|
| Ideal Vapor Compression with Freon-12 | 910 | 0 | 1.234 | — | 8.5 |

Assuming a five cent per kilowatt electricity cost, it can be seen that the electricity costs of the present system are more than offset by thermal output. In the hybrid mode, electrical consumption is always less than the electrical consumption of a pure vapor compression system. Even near the hybrid cut-off temperature of 125° F. (52° C.), the compressor is giving a compression ratio of 2 to 1, compared to 2.22 to 1 in a pure vapor compression system using Freon 12. By adding only a small amount of compression work, the useful range of the solar collector is greatly extended. In the hybrid mode, the use of a constant input volume compressor with a constant evaporator temperature (FIG. 1) or a constant condenser temperature (FIG. 2) will result in a compression ratio that changes with generator or absorber conditions. This permits the effective use of low performance solar collectors, rather than expensive, high performance solar collectors such as concentrators. In addition, the size of the necessary collector area can be reduced by improving the heat exchanger of the system. The recovery heat exchanger is often the most thermally inefficient component of an absorption refrigeration system. The following table shows the cost increase for a decline in C.O.P. in a continuous 3 ton output system collecting 75 BTU/sq. ft./hr:

| C.O.P. | Collector Required | Added Cost Above Last Example at $15/sq. ft. | at $20/sq. ft. |
|---|---|---|---|
| 1.0 | 480 | — | — |
| 0.9 | 533 | 795 | 1060 |
| 0.8 | 600 | 1005 | 1340 |
| 0.7 | 685 | 1275 | 1700 |
| 0.6 | 800 | 1725 | 2300 |

The heat exchanger 62 improves thermal efficiency by warming solution to be boiled in the generator with hot strong solution passing to the absorber. The difference in temperature between a fluid entering and a fluid leaving a heat exchanger will be the same for both countercurrent fluids if the rate of flow is the same. This difference is termed the approach temperature, and it is contemplated that solar panel cost savings in the present device will permit the use of heat exchangers providing approach temperatures of 10° F. (5.5° C.) or less.

The following example demonstrates the savings in solar collector cost. This example is based on typical conditions in the Southeastern United States, conditions for which the refrigeration system of the present invention is particularly suited. The outside temperature is 90° F. (32° C.), and the relative humidity is 85%. Due to high haze, dust and pollutants in the air, the sunlight striking a solar collector is cut from the normal 280 BTU/sq. ft./hr. to 175 BTU/sq. ft./hr. during the mid six hours of the day. A pure absorption refrigeration unit operates at a collection temperature of 190° F. (88° C.) at 22% collection efficiency to collect 38.5 BTU/sq. ft./hr. A refrigeration system of the present invention operating in the hybrid mode at a collection temperature of 150° F. (66° C.) will operate at 45% collection efficiency to collect 78.7 BTU/sq. ft./hr. The absorption refrigeration unit would require 1336 sq. ft. of collector area to give 3 tons of cooling output at a C.O.P. of 0.7, while the hybrid system would require only 653 sq. ft. of collector area. Assuming a collector cost of fifteen dollars per square foot, installed, the cost difference is ten thousand two hundred and forty-five dollars. The vapor compressor will require 500 watts of electrical power at five cents per kilowatt hour to run the vapor compressor.

The embodiment of FIG. 1 may be termed a compressor internal configuration since the compressor acts on refrigerant circulating within the absorption cycle. This permits the trimodal operation described above. Another compressor internal configuration is shown in FIG. 2.

The Embodiment of FIG. 2

Referring now to FIG. 2, an absorption refrigeration system is provided comprising a condenser, expansion device, evaporator, absorber and generator as described in connection with FIG. 1. A heat exchanger 202, spray nozzle 204, and solution pump 206 are also provided between the absorber and the generator as described in connection with FIG. 1. The generator, condenser, evaporator, absorber and heat exchanger comprise a refrigerant circuit. In addition to the lines connecting the refrigerant circuit, a first line 208 is provided between the evaporator-absorber line 210 and the generator-condenser line 212. A first valve means 214 is provided on the line 208 and a compressor 216 is provided on the line between the first valve and the connection 218 of the first line 208 with the generator-condenser line 212. When the first valve 214 is open, the compressor 216 is on and the system functions as a vapor compression refrigeration system. Second valve means, analogous to the values 122, 32 of FIG. 1 are closed while the system is in the vapor compression mode, to prevent vapor backup into the generator and the absorber. The second valve means comprises a second valve 220 on the generator-condenser line 212 between the first line junction 218 and the generator. The second valve means further comprises a valve 222 on the evaporator-absorber line, on the absorber side of the junction 209 of that line with the first line 208. A second line 224 having thereon a third valve means 226 extends from a portion of the first line 208 between the first valve 214 and the compressor 216, to a portion of the generator-condenser line 212 between the generator and the valve 220. When the third valve 226 is open, the valves 214, 220 in the first line and the generator-condenser line are closed, and the valve 222 in the evaporator-absorber line is open, providing a compressor-assisted refrigerant circuit as in the embodiment of FIG. 1. In contrast to FIG. 1, in the embodiment of FIG. 2, any waste heat from the compressor 216 enters the condenser as superheat above normal superheat content in the vapor from the generator. This heat must be disposed of in the condenser. Heat transfer coefficients for superheated gases compare unfavorably with heat transfer coefficients of a saturated condensing gas as in the absorber, where waste heat is rejected in the embodiment of FIG. 1. The embodiment of FIG. 2 is advantageous, however, in that the work load of the solution pump 206 is not increased by the compressor.

In the compressor internal configurations of FIGS. 1 and 2, the generator, heat exchanger and absorber are positioned at one level, and the condenser and evaporator are positioned at another, higher level. While it is known to use gravity to provide solution flow from the evaporator and condenser, back to the generator, for purposes of the present invention, solution pumps 64, 206 between the absorber and generator are preferred, due to the vapor pressure of the suitable refrigerant solutions.

The selection of a suitable refrigerant solution for the compressor-internal configurations of FIGS. 1 and 2 must be based on certain considerations other than those used in the selection of solutions for prior art absorption-refrigeration devices. Essentially, an absorption refrigeration device can utilize a salt solution, or a solution of any two fluids which have different boiling points. Prior art solutions have been selected primarily on the basis of large negative deviations from Raoult's law (i.e., a low absorbent volume requirement in the absorber and a high heat evolved upon solution) in an effort to minimize solution pump work and necessary heat exchange surfaces, mainly in the heat exchanger. Raoult's law states that for ideal solutions at a given temperature, the vapor pressure of solute over a solution (refrigerant over strong solution) is equal to its vapor pressure in the pure state multiplied by its mole fraction in the solution. If the same partial pressure is provided by a solution with a considerably greater mole fraction of refrigerant, the solution has a negative deviation from Raoult's law. A high heat of solution is characteristic of a high negative deviation. The absorbent required to transport the refrigerant is greatly reduced, reducing pump work, and the size of the recovery heat exchanger. This effect also results in a lower C.O.P., due to the evolution of heat in the absorber which must be replaced in the generator. For purposes of the present invention, a maximum C.O.P in the absorption refrigeration cycle is desired, making many common solutions unsuitable.

In addition, many known solutions are poisonous or corrosive to pump or compressor components. Ammonia and water, lithium bromide and water, and ammonia and sodium thiocyanate are unsuitable for these reasons. The solution of monomethylamine in sodium thiocyanate also exhibits possible long term corrosion. Corrosion and chemical stability problems are common with compounds having a high heat of vaporization, which is desirable as yielding a high C.O.P and requiring a low mass circulation rate.

The following solutes and solvents meet the above criteria for use in a hybrid absorption refrigeration system: dichlorodifluoromethane (F-12) into trichlorotrifluoroethane (F-113); F-12 into carbon tetrachloride; dichlorotetrafluoroethane (F-114) or F-12 into perchloroethylene; F-114 into toluene or para-xylene; pentane into p-xylene; trichlorofluoromethane (F-11) into biphenyl; and F-11 into perchloroethylene.

The Embodiments of FIGS. 3 & 4

The selection of a suitable solution for use in the hybrid mode is not necessary in the compressor assisted refrigeration system of FIGS. 3 and 4. In these embodiments, the compressor is external of the absorption refrigeration cycle, in a separate vapor compression cycle. Two separate refrigerants may therefore be used.

Referring now to FIG. 3, an absorption refrigeration circuit 302 as described in connection with FIG. 1 is provided, comprising a generator from which refrigerant vapor passes to a condenser, from which condensed vapor is passed through an expansion device 304 into an evaporator to produce output cooling. From evaporator, the refrigeration circuit 302 continues to an absorber where the refrigerant solution is reconstituted and passed through a solution pump 308 to a heat exchanger 306 and back to the generator. Strong solution from the generator passes through a line 309 to the heat exchanger 306 and through a nozzle 310 to the absorber. The generator comprises a main chamber 312 where the refrigerant solution is boiled by heat rejected from a second condensing means such as a finned tube or a coil 314 wherein condensation in a vapor compression refrigeration system is taking place. A compressor 316 compresses vapor which passes through an input line 318 to the coil 314. Condensed vapor from coil 314 leaves through output line 320 and passes through an expansion device 322 to a second evaporator 324. The second evaporator 324 receives heat from a solar collector as described in connection with the solar collector of FIG. 1. The second evaporator 324 may be a tube and shell device or a finned chamber surrounded by warm material like the evaporator 12 in FIG. 1.

Any waste heat generated by the compressor 316 is used directly by the generator to increase the C.O.P of the system. A relatively small amount of electrical energy is used to upgrade the performance of the generator and to provide a backup to the solar energy heat source to the second evaporator 324. A drawback to this configuration, however, is the extra exchange surface of the coil 314 between the heat source and the generator.

Another compressor external configuration is shown in FIG. 4. An absorption refrigeration system comprising a refrigeration circuit 402 between a generator, condenser, evaporator and absorber is employed as in FIG. 1. The condensed refrigerant is passed in the refrigeration circuit through an expansion device 404 for evaporation in the evaporator. Reconstituted solution from the absorber is returned to the generator by a solution pump 406 outputting into a heat exchanger 408. The heat exchanger 408 operates countercurrently with a line 410 carrying strong solution from the generator through a nozzle 412 into the absorber. The condenser, generator, heat exchanger and absorber are as shown in FIG. 1. The evaporation in the present embodiment comprises a main chamber 414, wherein the refrigerant is vaporized to absorb heat, and a coil 416 in the evaporator to provide a second condenser means, containing condensing refrigerant, juxtaposed with the boiling refrigerant in the evaporator. A finned tube may be used in place of a coil. The coil 416 is fed by a line 418 containing thereon a compressor 420 and leading to a second evaporator means 422, such as the evaporator 12 of FIG. 1, for providing output cooling by the evaporation of condensed refrigerant. A heat transfer fluid such as air or water to be circulated through the structure to be cooled is circulated across the second evaporator means to produce output cooling. Condensed refrigerant from the coil 416 passes into the second evaporator through line 424 comprising an expansion device 426 as previously described. The compressor 420 causes condensation in coil 416, thereby heating the evaporator and the fluid in the main chamber 414 of the evaporator. This lowers the generator shut-off temperature and improves C.O.P as previously explained. When sufficient solar heat is input to the generator, the compressor 420 may idle and the refrigerant in the fluid in the lines 418,424 between the output cooling evaporator 422 and the condensing coil 416 will flow and transfer heat by conduction and convection. Any waste heat produced by the compressor 420 that gets into the evaporator must be disposed of by the boiling refrigerant. This adds to the heat load of the evaporator, absorber, generator and condenser and thereby increases their load or decreases their efficiency. Furthermore, an extra heat-exchange surface in the form of the coil 416 is interposed between the absorption cycle, evaporator and the output cooling of the surrounding material produced by the second evaporator 422.

The compressor-assisted absorption refrigeration systems of FIGS. 1-4 improve the thermal C.O.P of an absorption refrigeration cycle, lower the generator shut-off temperature, and provide efficient backup systems for low heat input situations. These factors make the present refrigeration systems particularly useful with solar energy generator heat input and permit the use of low performance solar collectors. Solar panels may also be used in conjunction with the present invention to produce electrical energy. Other low grade heat sources, such as warm industrial waste water, geothermal energy, and so forth may also be used in place of solar energy.

While the present invention has been described in terms of refrigeration, it will be understood that by using a heat transfer fluid surrounding the condenser, and absorber output heating may be obtained in a manner similar to that obtained from a heat pump. It is contemplated that the inventive concepts may be employed in other modifications and constructions of the present invention and it is intended that the following claims be construed to include alternative embodiments except insofar as limited by the prior art.

What is claimed is:

1. In an absorption refrigeration system comprising generator means for generating a refrigerant vapor from a refrigerant solution, condenser means for condensing said refrigerant vapor from said generator means to form condensed refrigerant, evaporator means for evaporating said condensed refrigerant and for cooling a surrounding material, absorber means for absorbing vaporized refrigerant from said evaporator means into said solution, and a heat exchanger through which said solution is returned to said generator means, said generator means, condenser means, evaporator means, absorber means and heat exchanger means being connected by a refrigerant circuit, the improvement comprising:
 a first valve, on a first line of said refrigerant circuit, for regulating a flow of refrigerant in the first line;
 a second line connected at either end to said first line bypassing said first valve, and having a second valve for regulating a flow of refrigerant in the second line;
 a compressor on said second line for compressing refrigerant in accordance with the regulation of said first and second valves and a third and a fourth valve;
 a third valve on a third line, said third line being comprised in said refrigerant circuit for regulating a flow of refrigerant in the third line; and
 a fourth line between said second line and said third line having therein a fourth valve for regulating a flow of refrigerant in the fourth line.

2. The system of claim 1 wherein said compressor is a piston-type compressor.

3. The system of claim 2 further comprising an oil separator on said second line, downstream of said compressor.

4. The system of claim 3 further comprising a bleed line from said refrigerant circuit to said second line upstream of said oil separator.

5. The system of claim 1 wherein said compressor is an oil free compressor.

6. The system of claim 1 wherein said compressor is a rotary compressor.

7. The system of claim 6 further comprising a bleed line from the refrigerant circuit in the area between the absorber means and the heat exchanger to the second line upstream of the compressor.

8. The system of claim 1 wherein said condenser means comprises a cooling air stream.

9. The system of claim 1, wherein said condenser means comprises a cooling water stream.

10. The system of claim 1 wherein said surrounding material cooled by said evaporator is air.

11. The system of claim 1 wherein said surrounding material cooled by said evaporator is water.

12. The system of claim 1 wherein said refrigerant solution is selected from the group consisting of dichlorodifluoromethane in trichlorotrifluoroethane, dichlorodifluoromethane in carbon tetrachloride; dichlorotetrafluoroethane in perchloroethylene, dichlorotetrafluoroethane in para-xylene, pentane in para-xylene, trichlorofluoromethane in biphenyl, and trichlorofluoromethane in perchloroethylene.

13. The system of claim 1 wherein said generator means comprises a separator assembly.

14. The system of claim 1 wherein said heat exchanger comprises heat exchanging means for producing an approach temperature of not more than 10° F.

15. The system of claim 14 further comprising:
 a solar collector for providing heat energy to said generator means.

16. The system of claim 15 wherein said solar collector is a low performance solar collector.

17. The system of claim 1 further comprising:
 a solar collector for providing heat energy to said generator.

18. The system of claim 17 further comprising a heat transfer fluid heated in said solar collector and passed to said generator to provide said heat energy.

19. The system of claim 18 wherein said solar collector is a flat plate solar collector.

20. The system of claim 18 wherein said solar collector is an open fluid film collector.

21. The system of claim 20 wherein said heat exchanger comprises heat exchanging means for producing an approach temperature of not more than 10° F.

22. A cooling system comprising:
 generator means for generating a refrigerant vapor from a solution, and for circulating said solution through an absorber means;
 condenser means for condensing said refrigerant vapor from said generator means to form condensed refrigerant;
 evaporator means for evaporating said condensed refrigerant and for cooling a surrounding material;
 absorber means for absorbing vaporized refrigerant from said evaporator means into said solution, said solution being returned to said generator means;

a heat exchanger for exchanging heat between fluids flowing between said generator means and said absorber means;

a first line, having a first valve, extending between the evaporator means and the absorber means;

a compressor for compressing vaporized refrigerant passing to said absorber;

a second line extending from a portion of said first line between said first valve and said evaporator, to said compressor, from the compressor to a second valve, and from the second valve to a portion of said first line between the first valve and the absorber;

a third line, having a third valve, extending between the generator and the condenser; and a fourth line, having a fourth valve, extending from a portion of the second line between the compressor and the second valve, to a portion of the third line between the third valve and the condenser, wherein said first line and first valve for bypassing the compressor; said second valve is for regulating refrigerant flow into the absorber, said third valve is for regulating flow from the generator to the condenser, and said fourth line and fourth valve are for providing and regulating flow between the compressor and the condenser.

23. The system of claim 22 further comprising:

a solar collector for providing heat energy to said generator.

24. The system of claim 22 wherein said solar collector is a flat plate solar collector.

25. The system of claim 23 wherein said solar collector is an open fluid film collector.

26. The system of claim 23 wherein said refrigerant solution is selected from the group consisting of dichlorodifluoromethane in trichlorotrifluoroethane, dichlorodifluoromethane in carbon tetrachloride; dichlorotetrafluoroethane in perchloroethylene, dichlorotetrafluoroethane in para-xylene, pentane into para-xylene, trichlorofluoromethane into biphenyl, and trichlorofluoromethane into perchloroethylene.

27. The system of claim 26 wherein said condenser means and said absorber means comprise a stream of cooling water.

28. The system of claim 26 wherein said heat exchanger comprises heat exchanging means for producing an approach temperature of not more than 10° F.

29. The system of claim 22 wherein said compressor is a piston compressor and further comprising oil separation means.

30. The system of claim 22 wherein said generator, heat exchanger and absorber are tube and shell devices.

31. In an absorption refrigeration system comprising generator means for generating a refrigerant vapor from a refrigerant solution, condenser means for condensing said refrigerant vapor from said generator means to form condensed refrigerant, evaporator means for evaporating said condensed refrigerant and for cooling a surrounding material, absorber means for absorbing vaporized refrigerant from said evaporator means into said solution, and a heat exchanger through which said solution is returned to said generator means, said generator means, condenser means, evaporator means, absorber means and heat exchanger means being connected by a refrigerant circuit, the improvement comprising:

a first valve, on a first line of said refrigerant circuit, for regulating a flow of refrigerant in the first line;

a second line connected at either end to said first line bypassing said first valve, and having a second valve for regulating a flow of refrigerant in the second line;

a piston-type compressor on said second line for compressing refrigerant in accordance with the regulation of said first and second valves and a third and a fourth valve;

a third valve on a third line, said third line being comprised in said refrigerant circuit for regulating a flow of refrigerant in the third line;

a fourth line between said second line and said third line having therein a fourth valve for regulating a flow of refrigerant in the fourth line;

an oil separator on said second line, downstream of said piston-type compressor; and a bleed line from said refrigerant circuit in the area between the absorber means and the heat exchanger to said second line upstream of said oil separator.

* * * * *